(12) United States Patent
Raff

(10) Patent No.: US 6,450,247 B1
(45) Date of Patent: Sep. 17, 2002

(54) AIR CONDITIONING SYSTEM UTILIZING EARTH COOLING

(76) Inventor: Samuel Raff, 8312 Snug Hill La., Potomac, MD (US) 20854

(*) Notice: Subject to any disclaimer, the term of this patent is extended or adjusted under 35 U.S.C. 154(b) by 0 days.

(21) Appl. No.: 09/840,903

(22) Filed: Apr. 25, 2001

(51) Int. Cl.[7] .................................................. F28D 3/00
(52) U.S. Cl. ........................................... 165/45; 62/260
(58) Field of Search ............................. 165/45, 104.21; 62/260

(56) References Cited

U.S. PATENT DOCUMENTS

| | | | |
|---|---|---|---|
| 2,165,854 A | | 7/1939 | Headrick |
| 2,438,720 A | * | 3/1948 | Smith .......................... 159/902 |
| 2,637,531 A | * | 5/1953 | Davidson ..................... 165/100 |
| 3,195,619 A | | 7/1965 | Tippmann |
| 4,040,480 A | * | 8/1977 | Richards ................ 165/104.26 |
| 4,157,730 A | * | 6/1979 | Despois et al. ................ 165/45 |
| 4,793,146 A | * | 12/1988 | Ryokai ........................ 165/45 |
| 5,322,115 A | | 6/1994 | Hildebrand |
| 5,533,355 A | | 7/1996 | Rawlings |
| 5,579,830 A | | 12/1996 | Giammaruti |
| 5,738,164 A | | 4/1998 | Hildebrand |
| 5,803,161 A | | 9/1998 | Wahle et al. |

* cited by examiner

Primary Examiner—Allen Flanigan
(74) Attorney, Agent, or Firm—Hoffman, Wasson & Gitler, P.C.

(57) ABSTRACT

The system uses a well drilled deep into the ground and filled with water. The well is encased and sealed at its bottom to prevent the loss of water. The casing of the well is in contact with the surrounding earth for heat conduction. A pipe is placed within the well with a pump at its distal end. The pump draws cold water from within the well into the pipe, out of the well into a heat exchanger where it cools the air which, in turn, cools the house. After the water has gone through the heat exchanger, it is returned to the well. Heat pipes are used to dissipate, in winter, the heat accumulated during the summer cooling months. The heat pipes extend outwardly from near the top of the well and contain a substance that will absorb heat and evaporate at the end in the well and condense and release heat at the opposite end. An upward slant of the heat pipe ensures that this heat transfer occurs only in the direction away from the well.

10 Claims, 1 Drawing Sheet

AIR CONDITIONING SYSTEM UTILIZING EARTH COOLING

FIELD OF THE INVENTION

A system for using heat pipes and a deep well drilled in the ground as a heat sink for air conditioning systems without a compressor.

BACKGROUND OF THE INVENTION

The invention was disclosed in Disclosure Document No. 461662, entitled Earth Cooling, received by the Patent Office on Aug. 31, 1999, and listing Samuel J. Raff as inventor. Peak electricity load during the summer is due to the use of air conditioning. In conventional air conditioners, the main energy consumer is the compressor. This increases the pressure and temperature of the gaseous working fluid (usually freon) enough so that if the compressed gas is cooled (by a heat sink) to within a few degrees of room temperature, it will condense into a liquid. It is the subsequent evaporation of this liquid which further cools the coils to below 60° F. so that the air flowing over them is adequately cold that it can cool the living spaces. Notice that the heat sink need not be below room temperature, and in fact, most common home air conditioners cool the compressed gas using outside air in a heat exchanger.

Several prior art devices have utilized the earth as a source of heat and as a heat sink. One example is a geothermal heat pump having the working fluid from the heat pump flow through tubes that are buried several feet below the ground. The heat pump can act as either a heater or an air conditioner; therefore, the fluid flowing through the pipes uses the surrounding earth as both a heat source and heat sink.

U.S. Pat. No. 5,738,164 (Hildebrand) discloses such a system for energy exchange between the earth and an energy exchanger 4. The disclosed device affects energy exchange between earth soil and an energy exchanger. The device includes a soil heat exchanger 25, and supply and return flow conduits for connecting the soil exchanger with the energy exchanger. The soil heat exchanger includes a thermoinsulated supply pipe arranged in a bore well formed in the ground, a pump provided at the end of the flow duct 27 and a shroud pipe 34 surrounding the flow duct and the pump. Lateral inlet openings 46 and a return flow pipe 40 complete the system. A section of the shroud pipe 34 functions as a thermopipe and the system can reach a depth of 800 meters. A thermopile is a thermal insulated section formed with a correspondingly bigger wall thickness.

U.S. Pat. No. 3,195,619 (Tippmann) discloses a heat transfer method for precluding the formation of ice on pavement. Heat pipes transfer heat to the pavement from the natural heat of the earth below the frost level. A lower end of the vessel contains a measured amount of a volatile substance, such as ammonia, convertible to a liquid state at low temperature at approximately 30° F. and to a gaseous state at higher temperatures, depending upon the pressure.

U.S. Pat. No. 5,533,355 (Rawlings) discloses a ground source heat pump system with subterranean piping insulation and a modular heat exchanger.

The prior art does not disclose a system for using the ground as a heat sink without a compressor as in the present invention. Such a system must require that the ground temperature remain below or close to 60° F. The normal deep ground temperature in the vicinity of the major population dense areas of Boston, New York, Philadelphia, Washington, D.C. and Richmond on the east coast of the United States is below 57° F., but it will not remain that low after a season of being used as a heat sink. However, in all these population dense areas, as well as many others in the world, the winters are cold. This provides an opportunity to cool the ground during the winter so that it may be used as a heat sink again in the next air conditioning season.

It is an object of the invention to provide a system that provides cool water for an air conditioning system relying upon the earth as a heat sink.

It is another object of the invention to provide a system using the earth as a heat sink that is inexpensive to build and operate.

It is another object of the invention to provide a cooling system using the earth as a heat sink that is reliable in its operation.

It is another object of the invention to provide a system using the earth as heat sink that removes accumulated heat during winter months.

It is another object of the invention to provide an air conditioning system that uses a minimum amount of electricity to reduce peak electricity use during the summer.

These and other objects of the invention will become apparent to one of ordinary skill in the art after reviewing the disclosure of the invention.

SUMMARY OF THE INVENTION

The system uses a well drilled into the ground and filled with water. The well is encased and sealed at its bottom to prevent excessive loss of water. The casing of the well is in contact with the surrounding earth for heat conduction. A pipe is placed within the well with a pump at its distal end. The pump draws cold water from within the well into the pipe, out of the well into a heat exchanger which is preferable in the air flow of the house heating system. After the water has gone through the heat exchanger, it is returned to the well. A float operated valve of conventional type, not shown in the drawing, can be used to automatically add water to the well.

Heat pipes like those described by Trippman are used to dissipate, in winter, the heat accumulated in the ground during the summer cooling months. They extend outwardly and upward from the water near the top of the well and contain a substance that will absorb heat and evaporate at the end in the well and condense and release heat at the opposite end. An upward slant of the heat pipe ensures that this heat transfer occurs only in the direction away from the well. These heat pipes cool the water in the well which in turn, cools the ground by conduction. The heat flows from the ground into the well in the reverse of how it flowed in the summer. Two things about this are notable. First the heat pipes are unidirectional. They can only carry heat up and out of the well, never in the reverse direction. Second, they are completely passive so that no electric energy is consumed by the system in the winter. If they are in the ground (under a lawn for example) they should be buried at a depth of about three feet. However, they may also be under a paved area or even on a roof.

Also, for the well, the main thermal flow resistance in the ground is in the immediate vicinity of the well. Therefore, a deeper well, or a well of larger diameter, will make the system more effective. It is also noteworthy that, although the system described here is intended for a detached one family home, by increasing the well depth and possibly its diameter, a similar system can be effective for a block of attached homes, an apartment complex and even an office complex or larger building. The system operates well in regions where air conditioning is required in the summer but the winters are cold.

DETAILED DESCRIPTION OF THE INVENTION

Figure 1:
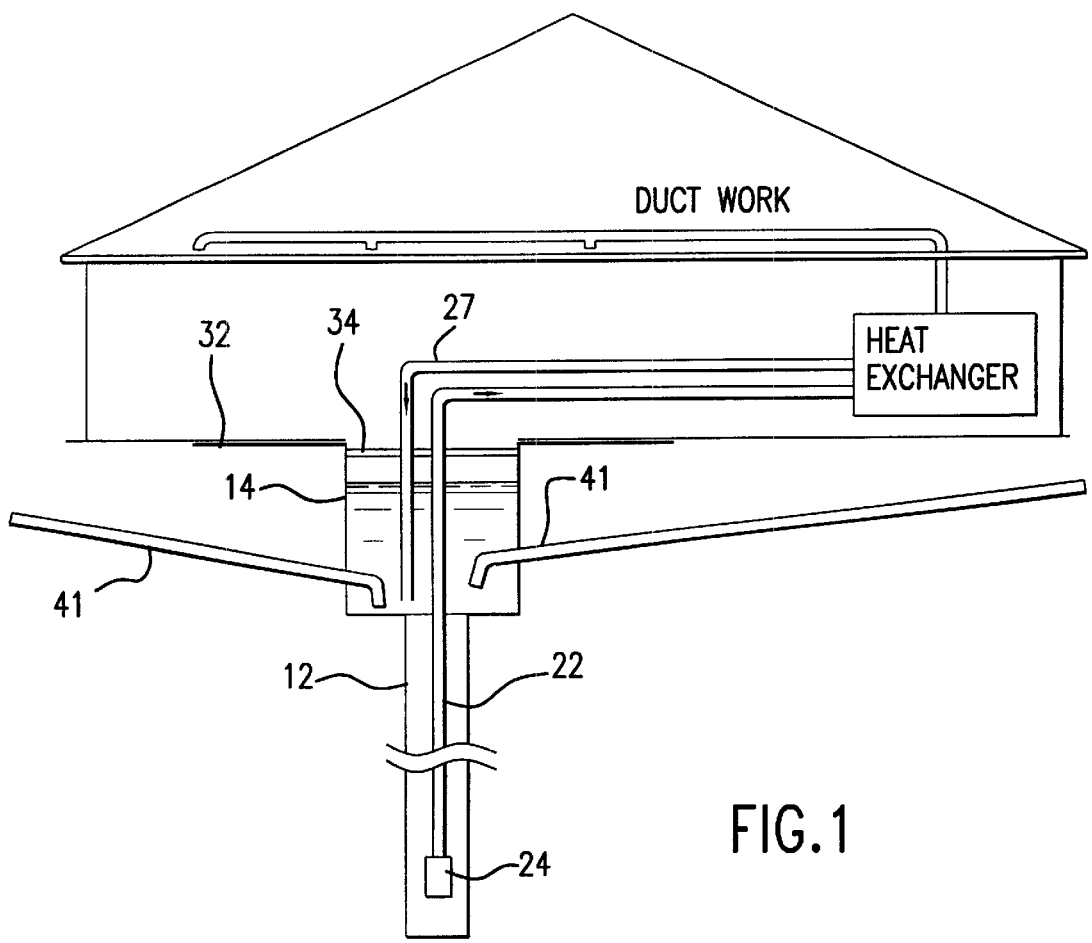
FIG. 1 is a schematic view of the system of the invention.

The system is depicted in FIG. 1, where a well is drilled about 300 feet deep and lined with a well casement 12 sealed at its bottom. The well is approximately seven inches in diameter although it may be larger. A water pipe 22 extends the length of the well and terminates near its bottom. The top of the well 14 may be widened to be two to three feet in diameter and four to five feet deep. This feature is optional and makes it convenient for future system modifications or repairs. As can be seen, the well extends from ground level 32 which can be a basement floor. The top of the well may be covered. This cover serves to keep dirt and debris out of the well and for obvious safety reasons. A return pipe 27 returns used cooling water from the heat exchanger. Several heat pipes 41 extend from below the water level near the top of the well. The purpose of the heat pipes is explained later. The heat pipe is usually a copper pipe about an inch in diameter. The air is evacuated and a small amount of water, ammonia or other suitable liquid is added before the pipe is sealed at manufacture. A return pipe returns used cooling water from the heat exchanger.

The function of the system will now be described. The bottom of the well is capped and the well casing 12 prevents loss of water to the surrounding ground. The well is then filled with water. Thermal conductivity between the water in the well and the ground keeps the water cold. Water from the bottom of the well is pumped into pipe 22 by operation of the well pump 24. The water travels through the pipe 22 to a heat exchanger commonly used with current air conditioning systems. As it travels through the heat exchanger, the water rises in temperature. Used cooling water is vented back to the well by return pipe 27. The cover 34 can be removed to clean and service the well if necessary.

During the summer cooling months, when air conditioning is required by the house thermostat, the pump in the well is started, bringing up cool water from the bottom of the well, to cool the coils in the heat exchanger. The heat extracted from the circulating air in the house is transferred to the cooling water and returned to the well. It is then dissipated by conduction from the water within the well casement 12 to the surrounding earth. Over an extended period of time, the ground in the vicinity of the well casing will have a slight rise in temperature. It is therefore necessary to dissipate during the winter months the heat accumulated during the summer air conditioning months. This is accomplished by the use of heat pipes 41. Heat pipes are known in the prior art and disclosed in U.S. Pat. No. 5,579,830 (Giammaruti) and U.S. Pat. No. 5,803,161 (Wahle), the disclosures of which are incorporated herein by reference.

As mentioned previously, the heat pipe is a small diameter copper pipe having a small amount of water or other suitable liquid added at manufacture. Due to the reduced pressure in the pipe, the water boils at the bottom of the heat pipe, which is in contact with the water near the top of the well. Heat is thereby absorbed by the water in the form of the latent heat of evaporation. The pipe slopes upward as it extends from the well. The vapor condenses at the other end of the pipe and releases the heat absorbed during boiling before it flows back to its lower end. The heat pipe can only be used to cool the water in the ground because heat only flows in one direction when the liquid water flows to the low point and vapor travels to the high point. The top end of the heat pipe is about one meter below ground and can be used to heat the ground surface in winter where it can melt ice or snow on a driveway. By continually removing heat from the water within the well, heat accumulated in the ground during the summer months is dissipated during the winter months. This allows the efficient operation of the system over a period of years. More than one well and the associated heat pipes can be used for a single structure. In this instance, instrumentation can be used for selecting the coldest well. The system can be used in single family homes or any other additional dwelling, such as an office building, that requires air conditioning.

While the invention has been described with reference to a preferred embodiment, modifications and variations would be obvious to one of ordinary skill in the art without departing from the scope of the invention. Consequently, the invention should not be limited to the literal terms expressed in the claims, but should be accorded a broad scope of protection commensurate with the significant advance in the useful arts and sciences achieved by such invention.

I claim:

1. A method for storing heat in the ground, comprising the steps of:

drilling a well in the ground, encasing the well, filling the well with water, inserting a pipe into said well, pumping water from said well through said pipe, using the water to absorb heat, and dissipating heat from the water in the well by at least one heat pipe.

2. The method of claim 1, further comprising returning the water used to absorb heat to said well.

3. The method of claim 1, further comprising passing the water through a heat exchanger to absorb heat.

4. The method of claim 1, wherein said water is pumped into said pipe by a water pump attached to an end of said pipe.

5. The method of claim 1, further comprising enlarging the top end of said well.

6. A system for storing heat in the ground comprising:

a well in the ground, an encasement for said well, water in said well, said water separated from said ground by said encasement, a pipe extending into said well, said pipe having a distal end, a pump for pumping water from the well through said pipe, and at least one heat pipe for removing heat from said water in said well.

7. The system of claim 6, wherein said pump is a well pump attached to the distal end of said pipe.

8. The system of claim 6, further comprising a heat exchanger attached to said pipe for transferring heat from the air to be cooled to said water.

9. The system of claim 6, further comprising a return pipe for returning said water to said well after being pumped through said pipe.

10. The system of claim 6, wherein the top end of said well is enlarged.

* * * * *